United States Patent Office 3,527,024
Patented Sept. 8, 1970

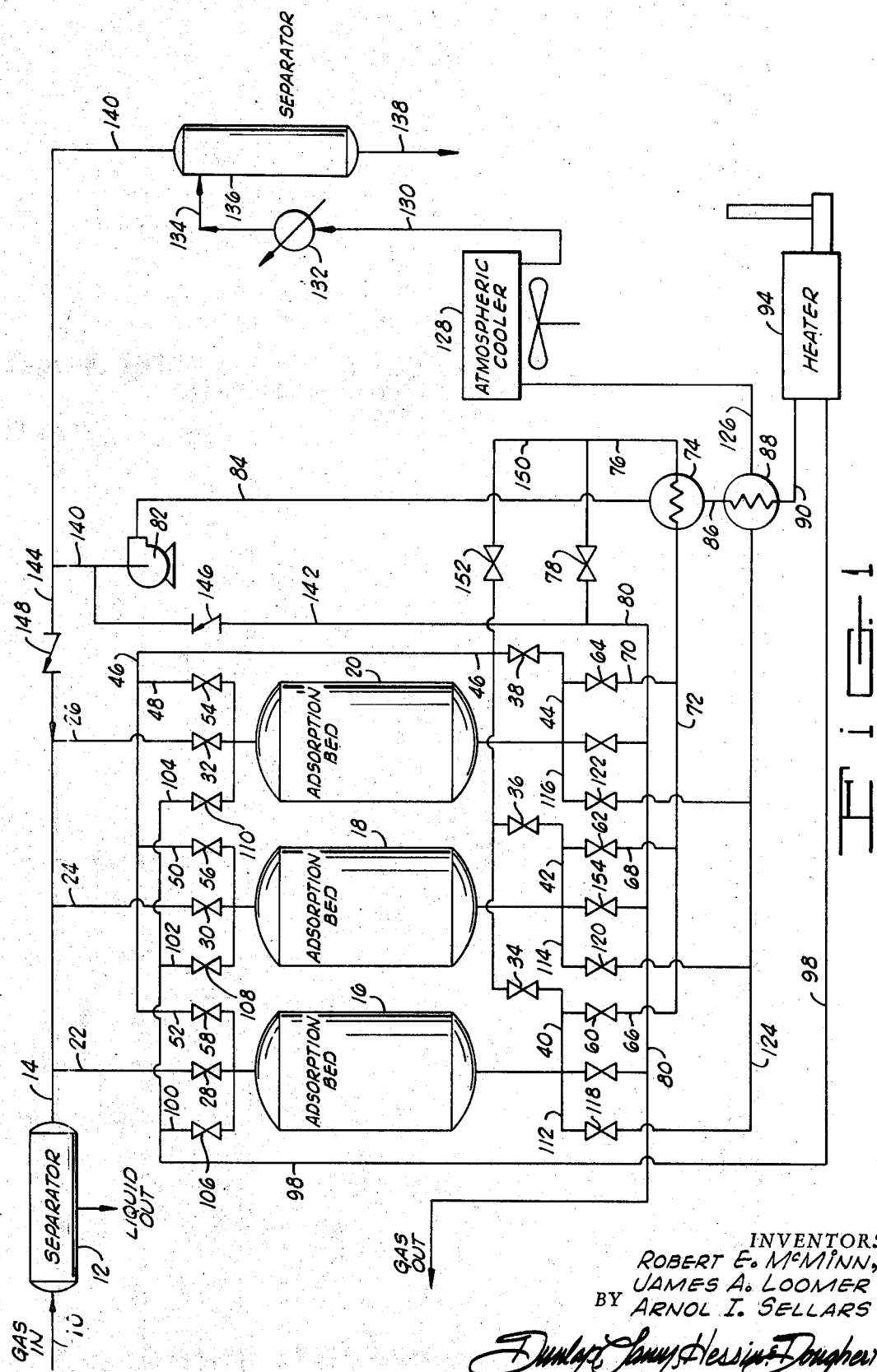

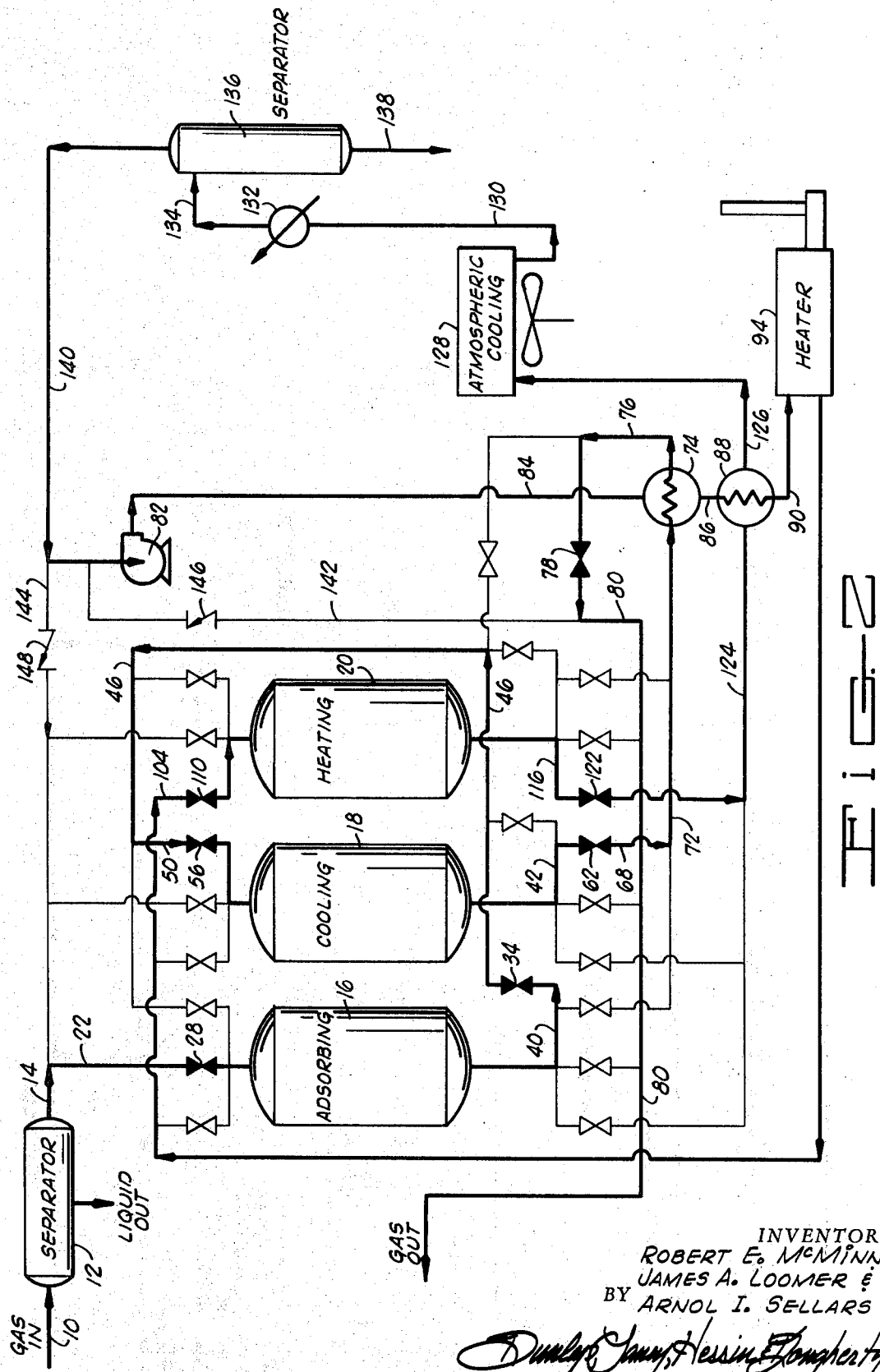

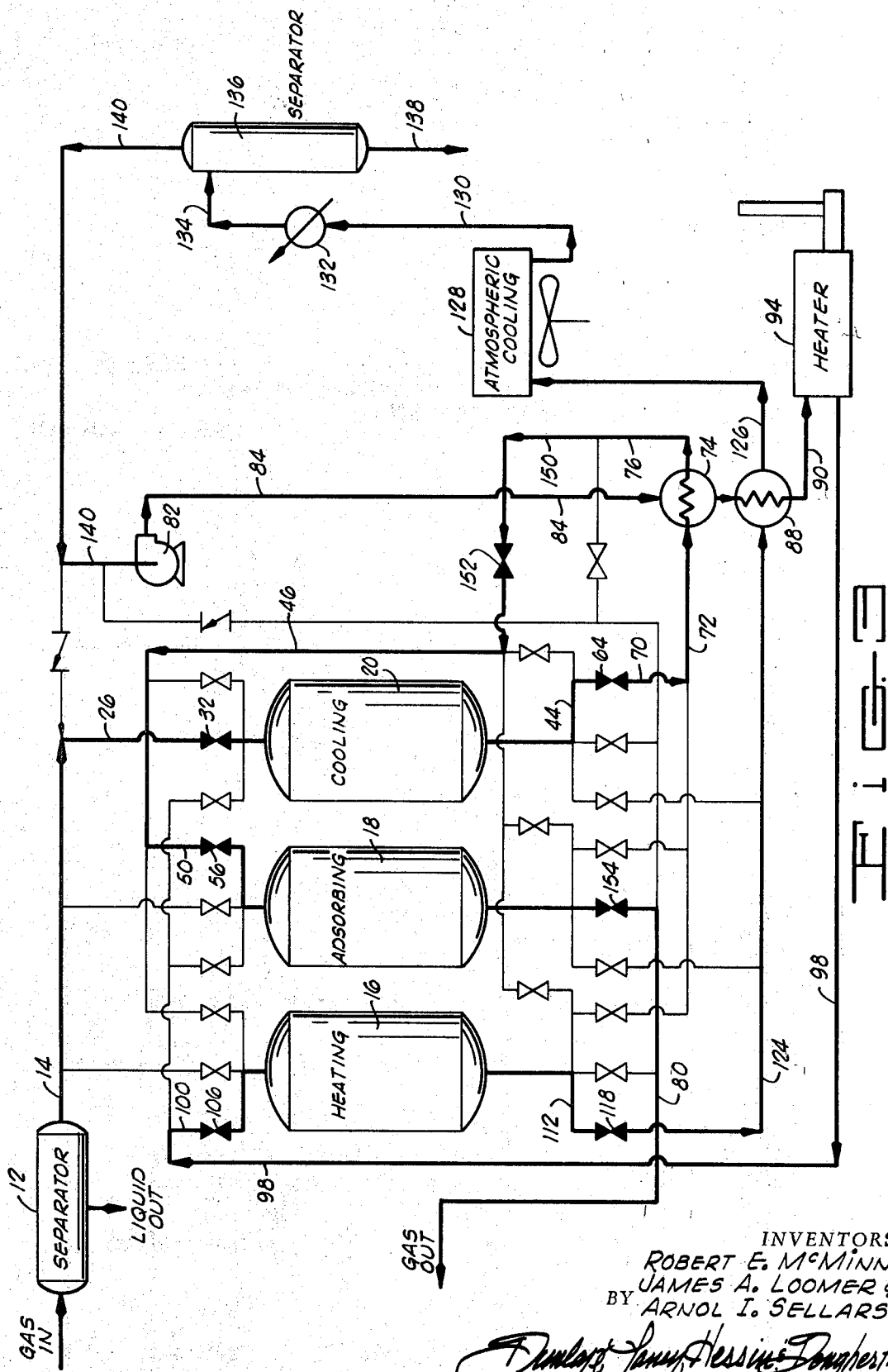

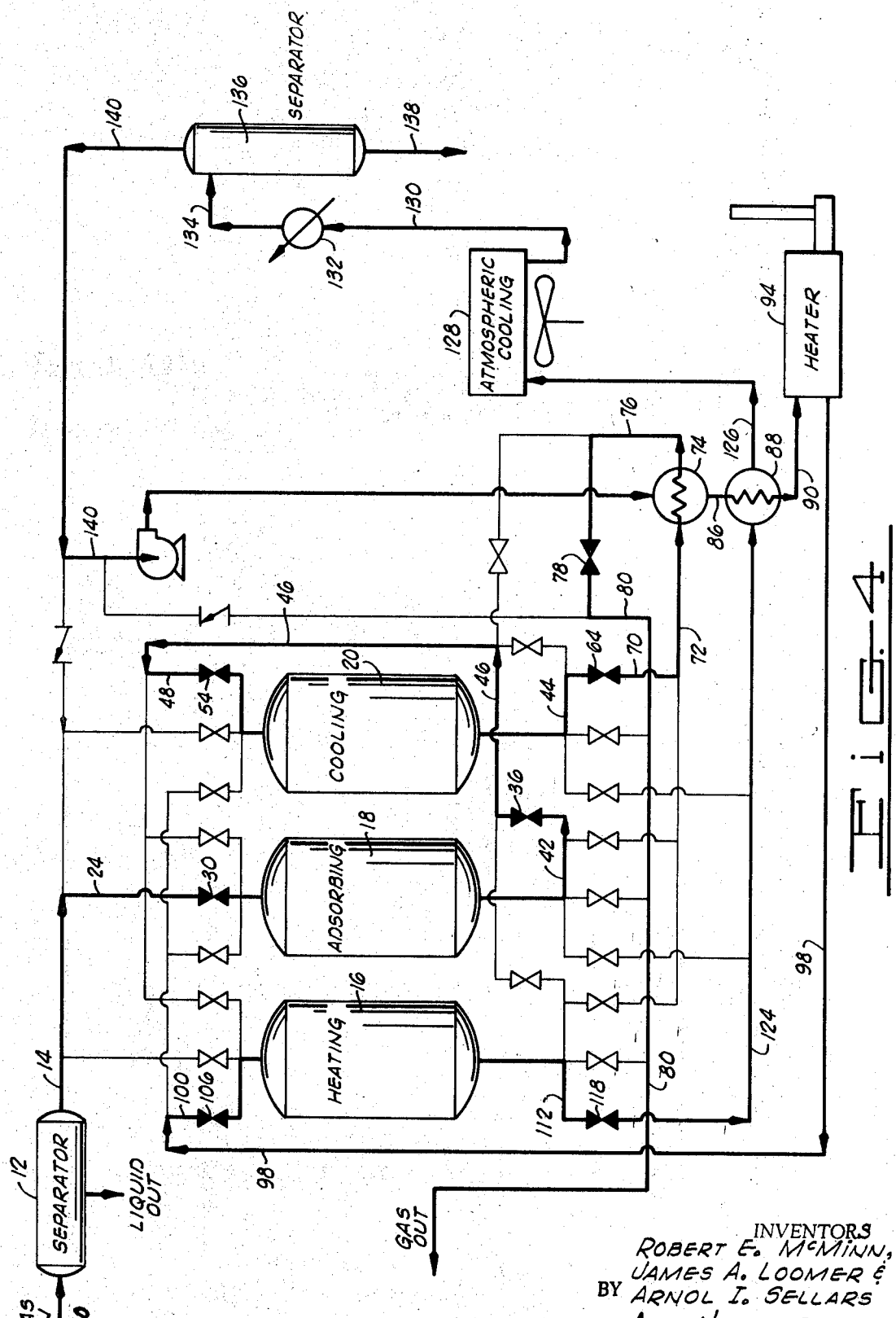

3,527,024
PROCESS FOR RECOVERING CONDENSIBLE
COMPONENTS FROM A GAS STREAM
Robert E. McMinn, James A. Loomer, and Arnol I.
Sellars, Oklahoma City, Okla., assignors to Black,
Sivalls & Bryson, Inc., Kansas City, Mo., a corporation of Delaware
Filed Nov. 5, 1968, Ser. No. 773,514
Int. Cl. B01d 53/04
U.S. Cl. 55—62
6 Claims

ABSTRACT OF THE DISCLOSURE

This invention relates to an improved process for adsorbing and recovering condensible components from a gas stream. More particularly, this invention relates to adsorbing the condensible components out of the inlet gas stream in one of a plurality of stationary adsorption beds while simultaneously cooling one or more of the other adsorption beds with the residue gas stream from the adsorbing bed. At the same time one or more other adsorption beds are heated by a regeneration gas stream in a closed cycle thereby stripping and vaporizing the condensible components contained therein. A special main gas flow pattern is utilized at the beginning of each cycle to prevent condensible components remaining in the bed or beds just heated from being lost with the gas stream leaving the process.

BACKGROUND OF THE INVENTION

Many continuous cycle stationary adsorption bed processes have been developed of the type wherein one or more beds are utilized for adsorbing condensible hydrocarbon or other components from a gas stream while the other beds are being regenerated. In these prior processes regeneration of the bed or beds which are saturated with condensible components is accomplished by heating the beds or beds with a portion of the inlet gas in an open cycle, or with a closed cycle of regeneration gas, thereby stripping out the condensible components. The hot stripped bed is then cooled with a gas stream which may be the same stream used for heating and stripping the bed after the stream has been cooled and the desired components condensed out of it, or all or part of the inlet gas stream may be used. The adsorption beds are continuously switched or cycled so that the bed or beds which have just become saturated with condensible components are heated and stripped, the beds or beds which have just been heated and stripped are cooled, and bed or beds just cooled adsorb additional condensible components from the main gas stream. The length of each cycle is predetermined based on various design factors such as the volume and composition of the gas stream being processed, the components desired to be recovered, etc.

In the application where it is desirable to recover condensible components such as methane and other heavier hydrocarbon compounds from a gas stream, prior stationary bed adsorption processes have been unsuccessful in bringing about the recovery of a relatively high percentage of the components available in the gas stream. This has been primarily due to the fact that in prior processes utilizing either open or closed regeneration systems, the cooling gas stream is not sufficiently void of the condensible compounds to cause a sufficient equilibrium shift within the bed being regenerated. That is, while heating the bed with a hot regeneration gas stream will strip out and vaporize a sufficient quantity of condensible components from the bed or beds, the stream used for cooling the bed is not sufficiently void of condensible components and a redeposit or readsorption of condensible compounds on the bed or beds will take place.

While attempts have been made to utilize the main gas stream residue after it has had condensible components removed from it as a cooling gas stream, these attempts have been largely unsuccessful due to the fact that some condensible components remaining as vapor in the bed or beds just heated and stripped are carried out of the process at the beginning of the cooling phase with the main gas stream residue and are lost.

The present invention provides a process for recovering condensible components from a gas stream wherein a special short duration main gas flow pattern is provided for at the beginning of each cycle whereby condensible components remaining in the bed just heated are prevented from being lost with the main gas residue leaving the process. During the remainder of said cycle, the main gas stream residue leaving the bed adsorbing condensible components is used to cool the bed just heated, thereby preventing redepositing or readsorbing of condensible components.

SUMMARY OF THE INVENTION

The present invention is directed to a process for recovering condensible components from a gas stream containing a plurality of stationary adsorption beds wherein a first bed adsorbs condensible components from said gas stream, a second bed is simultaneously cooled, and a third bed is simultaneously heated and stripped.

The gas stream is serially passed during a first part of each cycle through said second bed so that condensible components contained within said second bed are swept out, and through said first bed so that condensible components are adsorbed from said gas stream. The first and second beds are then switched so that during the remainder of each cycle said gas stream serially passes through said first bed wherein condensible components are adsorbed therefrom, and said second bed whereby said second bed is cooled. Said third bed is simultaneously heated and condensible components are stripped from it with a closed circuit regeneraton gas stream. The condensible components stripped out of said third bed are condensed and recovered from said regeneration gas stream.

It is, therefore, a general object of the present invention to provide an improved process for recovering condensible components from a gas stream.

A further object of the present invention is the provision of a process for recovering condensible components from a gas stream wherein relatively high percentages of the condensible components available in the gas stream are recovered.

Yet a further object of the present invention is the provision of a process for recovering condensible components from a gas stream wherein at the beginning of each cycle said gas stream is serially passed through the bed just heated so that condensible components remaining therein are swept out and through the bed just cooled thereby preventing said condensible components from being lost.

Still a further object of the present invention is the provision of a process for recovering condensible components from a gas stream wherein the residue of said gas stream from the bed adsorbing condensible components is used for cooling the bed just heated and swept out so that condensible components are not adsorbed by the bed while it is cooling.

Other and further objects, features and advantages will be apparent from the following description of the presently preferred embodiments of the invention, given for the purpose of disclosure, and taken in conjunction with the accompanying drawings.

DESCRIPTION OF THE DRAWINGS

In the drawings forming a part of the disclosure herein, like character references designate like parts throughout the several views wherein FIG. 1 illustrates in diagrammatic form apparatus for carrying out the process of this invention, FIG. 2 illustrates in diagrammatic form the apparatus of FIG. 1 with the main gas and regeneration gas flow patterns during the latter part of a first cycle shown, FIG. 3 illustrates the apparatus of FIG. 1 with the main gas and regeneration gas flow patterns during the first part of a second cycle shown, and FIG. 4 illustrates the apparatus of FIG. 1 with the main gas and regeneration gas flow patterns during the remainder of the second cycle shown.

DESCRIPTION OF THE PREFERRED EMBODIMENT

Referring now to the drawings, and more particularly to FIG. 1. A gas stream containing condensible components is conducted to separator 12 through conduit 10. While within separator 12 free liquids contained in the gas stream are separated and removed. The gas stream then passes into conduit 14 from where it enters one of adsorption beds 16, 18 or 20 through conduits 22, 24 and 26 and switching valves, 28, 30 or 32. While within one of adsorption beds 16, 18 or 20 condensible components are adsorbed from the gas stream. The main gas residue then passes out of one of the adsorption beds through switching valve 34 and conduit 40, switching valve 36 and conduit 42 or switching valve 38 and conduit 44 into conduit 46. From conduit 46 the gas stream passes through conduit 48 and switching valve 54 conduit 50 and switching valve 56, or conduit 52 and switching valve 58 into one of adsorption beds 16, 18 or 20, thereby cooling the bed. From the adsorption bed cooled, the main gas stream passes through conduits 40 and 66 and switching valve 60, conduits 42, 68 and switching valve 62 or conduits 44, 70 and switching valve 64 into conduit 72 from where it is conducted to heat exchanger 74. While within heat exchanger 74 the main gas stream is cooled and then passes through conduit 76 into switching valve 78 and into conduit 80. From conduit 80 the main gas stream is conducted out of the process to a distribution line or other point of destination.

Pump 82 circulates a closed regeneration gas stream through conduit 84 and into heat exchanger 74 where it exchanges heat with the main gas stream thereby cooling the main gas stream and heating the regeneration gas. From heat exchanger 74 the regeneration gas passes into heat exchanger 88 where it is further heated, into conduit 90 and into heater 94. While within heater 94 the regeneration gas stream is further heated to approximately 600° F. It then passes through conduit 96 into conduit 98 from where it enters conduit 100 and switching valve 106, conduit 102 and switching valve 108 or conduit 104 and switching valve 110 into one of adsorption beds 16, 18 or 20. The hot regeneration gas heats the bed thereby vaporizing and stripping out condensible components which have been adsorbed therein. From the heated bed the regeneration gas containing vaporized condensible components passes through conduit 112 and switching valve 118, conduit 114 and switching valve 120 or conduit 116 and switching valve 122 into conduit 124. Conduit 124 leads the regeneration gas stream to heat exchanger 88 wherein it is cooled by exchanging heat with the cooler stream of regeneration gas entering heat exchanger 88 through conduit 86. The partially cooled regeneration gas is then led by conduit 126 to atmospheric cooler 128 where it is further cooled. From atmospheric cooler 128 the regeneration gas stream is led by conduit 130 into heat exchanger 132 where it is still further cooled by exchanging heat with a refrigerant or water. The cooling of the regeneration gas stream in heat exchanger 88, atmospheric cooler 128 and heat exchanger 132 causes condensible components contained within the gas stream to condense. These condensed components and the remaining gas stream pass through conduit 134 into regeneration gas separator 136 where the condensed components are separated and removed. The thus separated and removed. The thus separated and recovered condensed components are led from separator 136 through conduit 138 to storage tanks or other destination points. The remaining regeneration gas then passes out of separator 136 through conduit 140 back to pump 82 from where it is again circulated through the regeneration gas circuit just described.

In operation, the switching valves are controlled by a timing device which continuously switches or cycles them at predetermined time intervals. The switching valves are arranged so that during each time interval or cycle the main gas stream serially passes through one of adsorption beds 16, 18 or 20 thereby adsorbing condensible components from the gas stream and through another of adsorption beds 16, 18 or 20 thereby cooling the bed. The third adsorption bed is simultaneously heated and stripped of condensible components by the closed circuit regeneration gas stream. The condensible components thus stripped from the adsorption bed being heated are condensed out of the regeneration gas stream and recovered.

It should be noted that for purposes of initially pressuring up the apparatus of the present invention, and to compensate for slight increases and decreases in the closed circuit regeneration gas volume, conduits 142 and 144 and check valves 146 and 148 are provided. Thus upon pressuring up, and if the volume of regeneration gas in the closed regeneration gas circuit decreases, main gas stream gas will pass through conduit 142 through check valve 146 into conduit 140. By the same token if the volume of regeneration gas in the closed regeneration gas circuit increases due to the failure of a heat exchanger or cooler, excess regeneration gas will pass through conduit 144 and check valve 148 into the main gas stream passing through conduit 14.

Turning now to FIG. 2 the main gas and regeneration gas flow patterns are illustrated at the latter part of a cycle. The main gas enters separator 12 through conduit 10 wherein free liquids are removed from it. From separator 12 the main gas enters conduit 14 and passes through conduit 22 and switching valve 28 into adsorption bed 16. While passing through adsorption bed 16, condensible components are removed from the main gas stream and adsorbed. The main gas residue leaving adsorption bed 16 passes through conduit 40 and switching valve 34 into conduit 46. From conduit 46 the gas stream passes through conduit 50 and switching valve 56 into adsorption bed 18. Since the main gas is relatively cool heat is transferred out of adsorption bed 18 into the main gas stream thereby cooling adsorption bed 18. Because the main gas has passed through adsorption bed 16 wherein condensible components are removed from it, no condensible components are adsorbed by adsorption bed 18 while it is being cooled with main gas.

The hot main gas stream leaving adsorption bed 18 passes through conduit 42, switching valve 62 and conduit 68 into conduit 72. From conduit 72 it enters heat exchanger 74 wherein heat is transferred from it to the regeneration gas stream entering heat exchanger 74 through conduit 84. The thus cooled main gas stream enters conduit 76 and passes through switching valve 78 into conduit 80 from where it passes out of the process to a point of distribution or further processing.

Regeneration gas is pumped by pump 82 into conduit 84. From conduit 84 the regeneration gas stream passes into heat exchanger 74 where heat is transferred to it from the main gas stream thereby partially heating it. From heat exchanger 74 the partially heated regeneration gas passes through conduit 86 into heat exchanger 88 where heat is transferred to it from the hot regeneration gas entering heat exchanger 88 through conduit 124. The further heated regeneration gas stream then passes through conduit 90 into heater 94 where it is still further heated. From heater 94 the hot regeneration gas passes through conduit 98, through conduit 104 and switching valve 110 into adsorption bed 20. By virtue of the hot regeneration gas stream passing through it, adsorption bed 20 is heated and condensible components contained within adsorption bed 20 are vaporized and stripped out. The hot regeneration gas stream containing vaporized condensible components passes out of adsorption bed 20 through conduit 116, switching valve 122 and into conduit 124. From conduit 124 the regeneration gas stream enters heat exchanger 88 where heat is transferred from it into the regeneration gas stream entering heat exchanger 88 through conduit 86. The thus partially cooled regeneration gas stream enters conduit 126 from heat exchanger 88 and passes into atmospheric cooler 128 where it is further cooled. From atmospheric cooler 128 the regeneration gas stream passes into conduit 130 through heat exchanger 132 where it is still further cooled and into conduit 134. Condensible components contained in the regeneration gas stream are condensed by virtue of heat transferred from the stream in heat exchanger 88, atmospheric cooler 128 and heat exchanger 132. The condensed components then enter separator 136 along with non-condensed regeneration gas and are separated from the regeneration gas and removed from separator 136 through conduit 138 from where they are passed to storage or further processing. The non-condensed regeneration gas stream then passes into conduit 140 from where it re-enters pump 82.

Turning now to FIG. 3 the flow patterns of the main gas and renegeration gas are shown at the beginning of a second cycle. The main gas stream leaves separator 12, passes through conduit 14, through conduit 26, through switching valve 32 and into adsorption bed 20 which was heated during the prior cycle.

Upon completion of the prior cycle, a high concentration of condensible components will remain in the adsorption bed just heated. These condensible components are swept from the bed by the main gas stream at the beginning of the second cycle by the main gas stream and pass out of adsorption bed 20 through conduit 44, switching valve 64, and conduit 70 into conduit 72. From conduit 72 the main gas stream containing these and other condensible components passes into heat exchanger 74 where heat is transferred from it into the regeneration gas entering heat exchanger 74 through conduit 84. From heat exchanger 74 the main gas stream passes into conduit 150, through switching valve 152, and into conduit 46. From conduit 46 it then passes into conduit 50 through switching valve 55 and into adsorption bed 18.

During the just prior cycle adsorption bed 18 was cooled so that condensible components are ready to be adsorbed by it during the next cycle. Therefore, the main gas stream passing into adsorption bed 18 during the second cycle has condensible components removed from it and adsorbed by bed 18. The residue gas passing out of adsorption bed 18 then passes through switching valve 154 and into conduit 80 from where it is removed from the process to a point of destination or for further processing.

Regeneration gas is pumped by pump 82 into conduit 84 from where it enters heat exchangers 74 and 88 thereby becoming partially heated. From exchanger 88 the regeneration gas stream enters conduit 90 and heat 94 wherein it is further heated. From heater 94 the hot regeneration gas stream passes through conduit 98 into conduit 100, through switching valve 106 and into adsorption bed 16. During the just prior cycle adsorption bed 16 was adsorbing condensible components from the main gas stream. The hot regeneration gas passing through it during the second cycle heats the bed thereby vaporizing and stripping the adsorbed condensible components from it. The hot regeneration gas containing these condensible components passes out of adsorption bed 16 through conduit 112, switching valve 118 and into conduit 124. From conduit 124 the regeneration gas and condensible components pass through heat exchanger 88, atmospheric cooler 128 and heat exchanger 132 thereby condensing the condensible components as previously described.

After a predetermined period of time sufficient to sweep out condensible components remaining in adsorption bed 20 at the beginning of the second cycle, the main flow pattern is switched to that shown in FIG. 4 for the remainder of the cycle. Referring to FIG. 4, the main gas stream passes out of separator 12 into conduit 14, through conduit 24, through switching valve 30 and into adsorption bed 18. From adsorption bed 18 the main gas stream residue passes through conduit 42, switching valve 36 and into conduit 46 from where it enters conduit 48 and passes through switching valve 54 into adsorption bed 20. Adsorption bed 20, having had condensible components swept from it at the beginning of the second cycle is cooled with the main gas stream residue thereby preventing redeposit of condensible components on the bed. The main gas stream then passes out of adsorption bed 20 through conduit 44, switching valve 64, conduit 70 and into conduit 72. From conduit 72 the gas stream is cooled in heat exchanger 74 and passes through conduit 76, switching valve 78 and into conduit 80 from where it is conducted to a point of distribution or further processing. The regeneration gas flow pattern for the latter part of the second cycle is the same as previously described for the beginning part of the second cycle.

The third cycle in each succeeding cycle is the same as the second cycle described above except that the absorption beds are switched in a manner whereby the bed just cooled becomes the bed adsorbing condensible components from the main gas stream, the bed just heated is swept of condensible components by the main gas stream and then cooled with the main gas stream residue, and the bed just adsorbing condensible components from the main gas stream is heated and stripped. Due to the fact that the main gas is routed through the adsorption bed just heated for a short period of time at the beginning of each cycle condensible components remaining in the bed are swept out with the main gas. These components and those already contained in the main gas are then adsorbed by the tower just cooled. After the initial sweeping of the bed just heated, the main gas flow pattern is changed so that the bed just heated is cooled with the main gas residue from the tower adsorbing condensible components. This prevents condensible components from being adsorbed by the adsorption bed being cooled during the latter part of the cycle and presents a bed for adsorbing condensible components during the next cycle which will be capable of adsorbing a maximum percentage of the condensible components in the main gas stream during the time period that the main gas stream passes through it. Thus, the present invention provides a process and apparatus which will recover a high percentage of condensible components available in the gas stream being processed in that condensible components remaining in the bed just heated are not lost with the residue gas leaving the process, and the main gas stream residue remaining after condensible components have been removed from it is used for cooling the bed to be next used for adsorbing thereby preventing readsorption of condensible components on the cooling bed.

What is claimed is:

1. In a continuous cyclic process for recovering condensible components from a main gas stream containing a plurality of stationary adsorption beds wherein one of said adsorption beds adsorbs condensible components from said gas stream, another of said beds is simultaneously cooled, and yet another of said beds is simultaneously heated and stripped, the improvement comprising:

serially passing said main gas stream during a first part of each cycle through a first bed so that condensible components contained within said first bed are swept out, and through a second bed so that condensible components are adsorbed from said main gas stream;

switching said first and second beds so that during the remainder of each cycle said main gas stream serially passes through said second bed wherein condensible components are adsorbed therefrom, and through said first bed whereby said first bed is cooled;

simultaneously heating and stripping condensible components from a third bed during each cycle with a regeneration gas stream; and condensing and recovering said condensible components from said regeneration gas stream.

2. The process as set forth in claim 1 wherein said regeneration gas stream is continuously circulated in a closed circuit.

3. The process as set forth in claim 2 including the additional step of passing said main gas stream in heat exchange relationship with said regeneration gas stream so that said main gas stream is cooled and said regeneration gas stream is heated.

4. A process for recovering condensible components from a gas stream which comprises:
   passing a main gas stream through a first adsorption bed so that condensible components are swept therefrom;
   then passing said main gas stream through a second adsorption bed so that condensible components are removed therefrom producing a main gas residue stream;
   conducting said main gas residue stream to a point of distribution;
   switching said main gas stream so that said main gas stream passes through said second adsorption bed wherein condensible components are removed therefrom producing a main gas residue stream, and so that said main gas residue stream passes through said first adsorption bed whereby said first adsorption bed is cooled, and so that said main gas residue stream is then conducted to a point of distribution;
   simultaneously heating a third adsorption bed with a regeneration gas stream so that condensible components are vaporized and stripped therefrom;
   cycling said main gas stream and said regeneration gas stream so that the adsorption bed removing condensible components from said main gas stream is heated with said regeneration gas stream, the adsorption bed cooled is removing condensible components from said main gas stream producing a main gas residue stream and the adsorption bed heated is swept with said main gas stream and then cooled with said main gas residue stream.

5. The process as set forth in claim 4 wherein said regeneration gas stream is continuously circulated in a closed circuit.

6. The process as set forth in claim 5 including the additional step of passing said main gas stream in heat exchange relationship with said regeneration gas stream so that said main gas stream is cooled and said regeneration gas stream is heated.

References Cited

UNITED STATES PATENTS

| | | | |
|---|---|---|---|
| 3,085,379 | 4/1963 | Kiyonaga et al. | 55—58 |
| 3,186,144 | 6/1965 | Dow | 55—62 |
| 3,243,938 | 4/1966 | Lavery et al. | 55—62 |
| 3,378,992 | 4/1968 | Pierce et al. | 55—62 |
| 3,486,852 | 12/1969 | Tamura et al. | 55—180 |

REUBEN FRIEDMAN, Primary Examiner

C. N. HART, Assistant Examiner

U.S. Cl. X.R.

55—180